United States Patent [19]

Fasth

[11] Patent Number: 4,566,738
[45] Date of Patent: Jan. 28, 1986

[54] POSITIONING APPARATUS

[76] Inventor: Ulf K. F. Fasth, Skolgatan 14, S-302 32 Halmstad, Sweden

[21] Appl. No.: 541,135

[22] Filed: Oct. 12, 1983

[30] Foreign Application Priority Data

Oct. 19, 1982 [SE] Sweden .................. 8205923

[51] Int. Cl.[4] ............... F16C 29/00; F16C 29/02
[52] U.S. Cl. ......................... 308/3 A; 308/3 R; 308/4 R
[58] Field of Search ........... 308/3 A, 3 R, 241, 4 R; 74/89.15, 424.8 R

[56] References Cited

U.S. PATENT DOCUMENTS

| | | | |
|---|---|---|---|
| 1,981,992 | 11/1934 | Curtis | 308/3 R |
| 2,048,757 | 7/1936 | Smith, Sr. | 308/3 R X |
| 2,163,604 | 6/1939 | Johnson | 308/3 R |
| 2,196,892 | 4/1940 | Berndt | 308/3 R |
| 2,422,495 | 6/1947 | Morrow. | |
| 2,523,393 | 9/1950 | Rhodes | 308/3 R |
| 2,707,659 | 5/1955 | Sloyan | 308/3 R |
| 2,760,925 | 8/1956 | Bryant | 308/241 X |
| 3,650,576 | 3/1972 | Hughes | 308/3 A |
| 4,199,996 | 4/1980 | Moriwaki et al. . | |

FOREIGN PATENT DOCUMENTS 997235  7/1965  United Kingdom .
1028677  5/1966  United Kingdom .

*Primary Examiner*—Donald Watkins
*Assistant Examiner*—Thomas R. Hannon
*Attorney, Agent, or Firm*—Harness, Dickey & Pierce

[57] ABSTRACT

A positioning apparatus in which a runner is arranged to travel backwards and forwards by way of a threaded spindle extending in the lengthwise direction of the apparatus and engaging the runner. The runner is slidably mounted on three guide members positioned symmetrically around the spindle and in parallel therewith. The guide members are parts of guiding profiled members forming part of the housing of the positioning apparatus. Special slide surfaces are arranged on the guide members. The housing of the positioning apparatus is manufactured through extrusion, preferably from a light material, such as aluminium, while the slide surfaces are made from a harder material.

5 Claims, 5 Drawing Figures

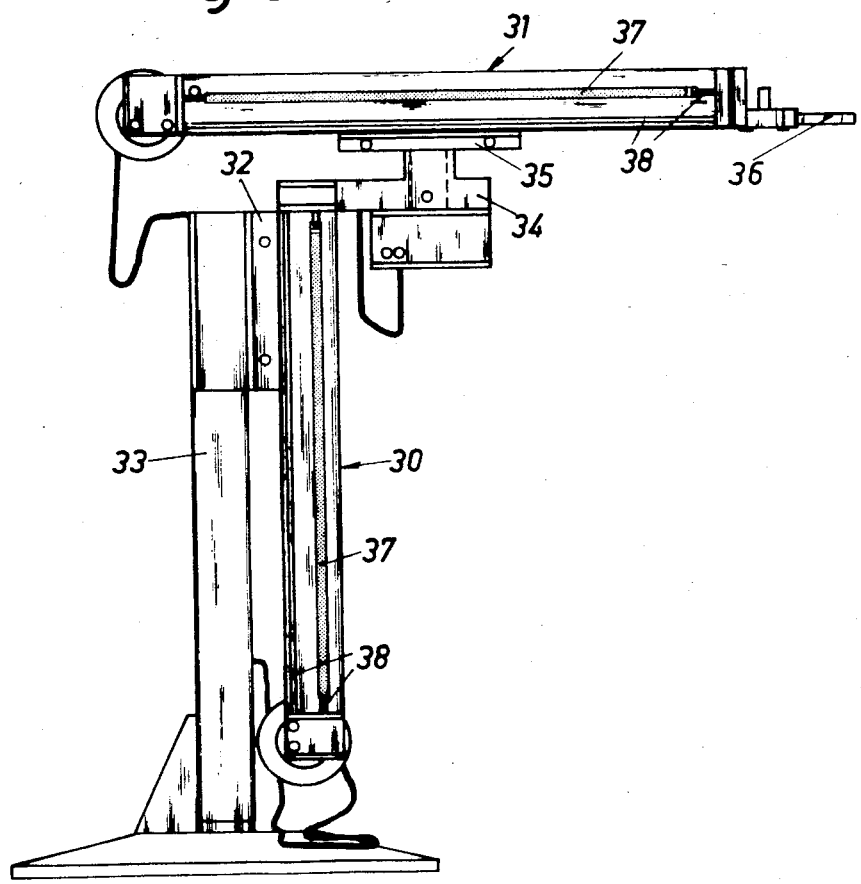

POSITIONING APPARATUS

BACKGROUND OF THE INVENTION

The subject invention concerns a positioning apparatus comprising an elongate housing in which is rotatably mounted a threaded spindle which extends lengthwise inside the housing and on which is mounted a runner engaging the threads of the spindle. The runner is provided with a member projecting in the transverse direction of the positioning apparatus and is arranged, upon rotation of the spindle to travel backwards and forwards in the housing along guides extending around and in parallel with the spindle.

Positioning apparatuses are known wherein an electric motor serves to turn the spindle, preferably via gear mechanism. The spindle may be in the form of a ball bearing screw engaging a nut sleeve of a special design comprising balls. The nut sleeve is connected with a tube known as a positioning tube projecting past the stand in the lengthwise direction thereof, the free end of said positioning tube supporting e.g. an articulated head or a yoke bracket by means of which articles to be displaced backwards and forwards to predetermined positions are secured to the apparatus.

Positioning apparatuses of this kind are useful in that they operate with great precision and with a high degree of efficiency. However, their use is restricted in that the positioning tube including the attachment means of the latter are but a prolongation of the stand.

Furthermore, cylinders comprising a double-acting pneumatic piston-and-cylinder unit are used, the piston of which supports a guide member extending transversely through the cylinder wall and participating in the piston movements, in addition to which this guide member serves as an attachment to support the articles to be moved. This apparatus is more versatile owing to its construction but nevertheless it suffers from certain drawbacks. Its efficiency, for instance, is considerably reduced compared with that of the positioning apparatus described initially and the pneumatic operation prevents movements to the various set positions with the same degree of precision.

SUMMARY OF THE INVENTION

The purpose of the subject invention is to combine in one and the same apparatus the advantages found in the two types of prior-art apparatuses described above. This is achieved by means of a structure made of an essentially light and cheap material, yet the apparatus is very durable.

It is characteristic of the positioning apparatus in accordance with the invention that the guides are integral parts of the housing and are provided with special slide surfaces exerting only minimal friction on the runner which is movable on said surfaces.

BRIEF DESCRIPTION OF THE DRAWINGS

The invention will be described in closer detail in the following with reference to the accompanying drawings, wherein FIGS. 4 and 5 show two practical applications of the positioning apparatus in accordance with the subject invention.

DETAILED DESCRIPTION OF A PREFERRED EMBODIMENT

Figure 1:
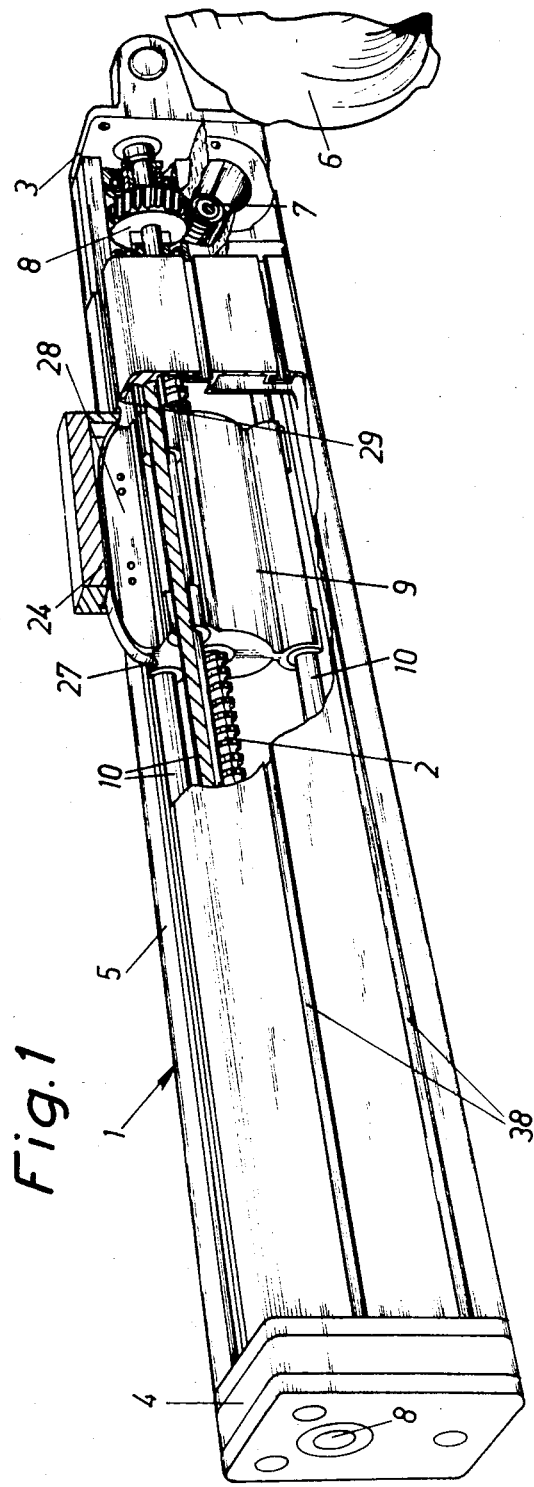
FIG. 1 is a partly broken perspective view of a positioning apparatus in accordance with the invention.

The positioning apparatus 1 comprises a threaded spindle 2 which is rotatably mounted in the end walls 3, 4 of a housing 5. The rotary motion of the threaded spindle 2 is effected by means of an electric motor 6 via a gear mechanism 7, 8.

A runner 9 is arranged in engagement with the threads of the spindle 2. The runner travels along the spindle 2, that is, in the lengthwise direction of the positioning apparatus 1, upon rotary motion of the spindle. In accordance with the embodiment shown in FIG. 1 the runner 9 is displaceably mounted on three guide members 10, one of which is positioned below the runner 9 and the other two above the latter.

Figure 2:
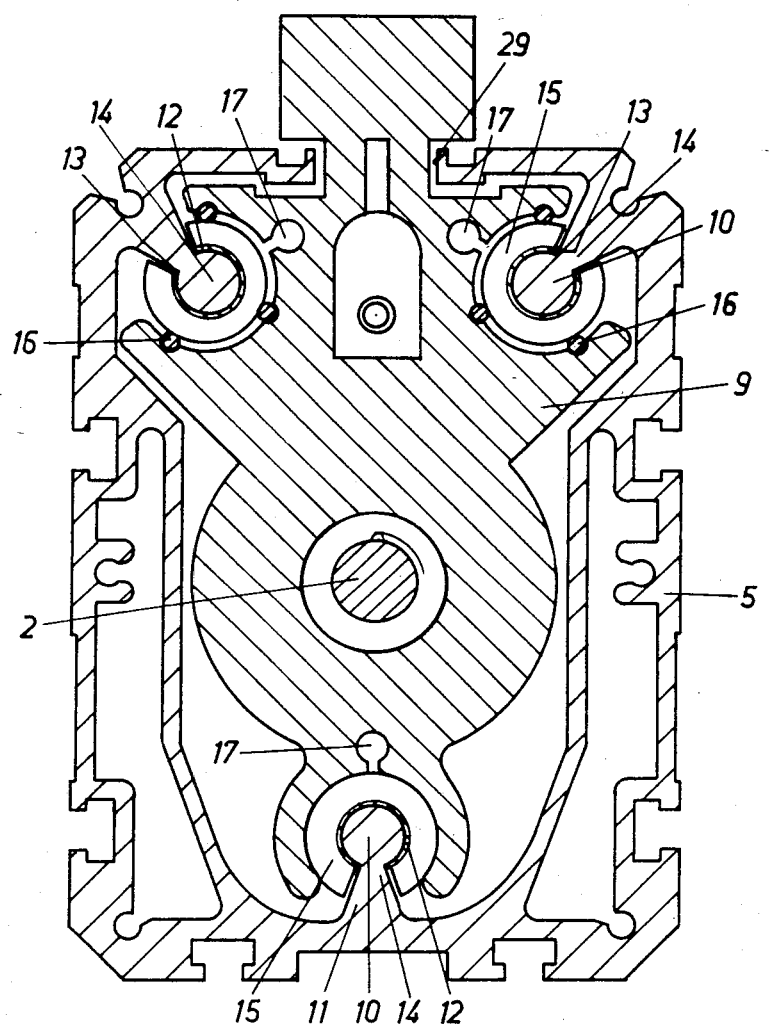
FIG. 2 is a cross-sectional view through the positioning apparatus in accordance with one embodiment thereof.

FIG. 2 illustrates the design and arrangement of the guide members 10 and the manner in which the runner 9 is mounted thereon. The guide members are part of a profiled member 11 and each one serves to secure a slide rail 12 made of a wear-resistant material, such as hard steel. The slide rails 12 enclose the guide members 10. The guiding profiled members 11 and the guide members 10 are integral with and form part of the housing 5. Since the wear on the guide members 10 is negligible it is possible to manufacture all of the part forming the protective cover from a light material, such as aluminium. The savings in weight and costs from this arrangement are considerable.

Preferably, the housing 5 is produced through extrusion, forming an elongate profiled member. The length of the slide rail 12 matches the length of the guide member 10. The slide rail is made from sheet metal bent into the shape of a tube in which is formed a lengthwise extending slit 13. The slit 13 has a width corresponding to a neck portion 14 on the profiled member 11. The runner 9 is mounted on the slide rails 12 with the aid of bushings 15. At least two of the bushings are mounted in the runner 9 on resilient means in the form of hard rubber rods 16. This arrangement provides some relative movement in the transverse direction of the bushing 15 and the runner 9. Accordingly, the device is adjusted to the tolerance variations which must be accepted in profiled members manufactured through extrusion. One advantage gained by this ability to adjust to deviations is the absence of any risks that the runner 9 catches on the guide members 10 when the positioning apparatus is very long, in which sagging of the central part of the apparatus may cause the runner to catch in this area.

The bushing 15 on the lower one of the three guide members 10 may, as indicated, be mounted omitting the resilient hard rubber bars 16. The configuration of the lower part of the runner 9 allows some play also in the absence or resilient mounting arrangements. The bushing 15 is locked to the runner 9 with the aid of screws which are screwed into locking apertures 17.

Figure 3:
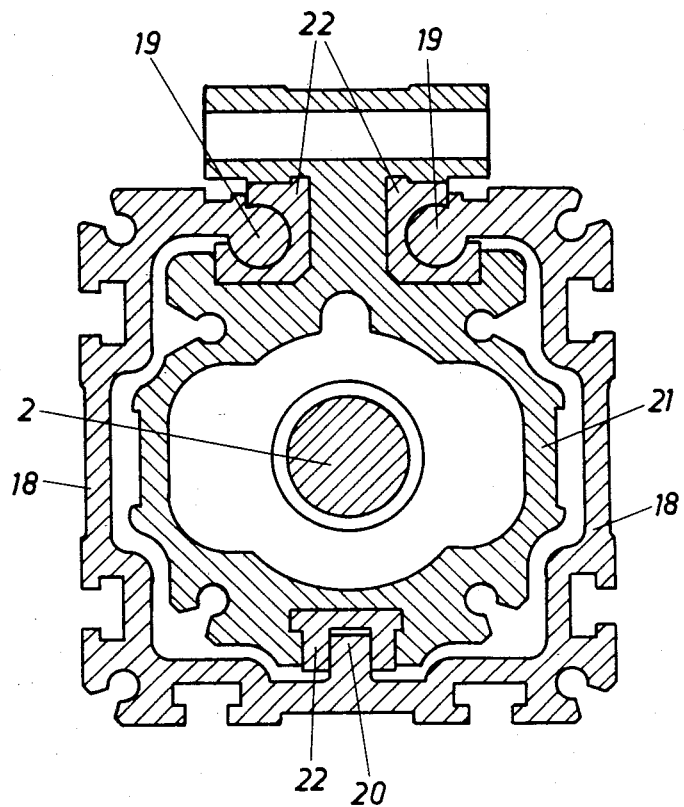
FIG. 3 is a cross-sectional view corresponding to the view of FIG. 2 but illustrating a second embodiment of the positioning apparatus.

Another embodiment of the positioning apparatus in accordance with the subject invention is shown in FIG. 3. The positioning apparatus in accordance with this embodiment includes a housing 18 which, like in the case of the embodiment of FIG. 2, is formed with two upper guide members 19 and one lower guide member 20. The upper guide members 19 control the runner 21 in both vertical and horizontal directions whereas the lower guide member 20 need only control the movement of the runner 21 horizontally. The runner 21 is mounted in bearings 22 which are somewhat simplified compared with those used in the embodiment shown in FIGS. 1 and 2. Also these bearings 22 allow some transverse relative movement of the runner 21 and the housing 18.

The positioning apparatus in accordance with the embodiment shown in FIG. 3 is made from aluminium. The guide members 19, 20 are not provided with a separate slide rail 12. Instead, their surfaces are exposed to an anodic treatment, wherein a wear-resistant layer is formed on the guide member surfaces.

Figure 4:
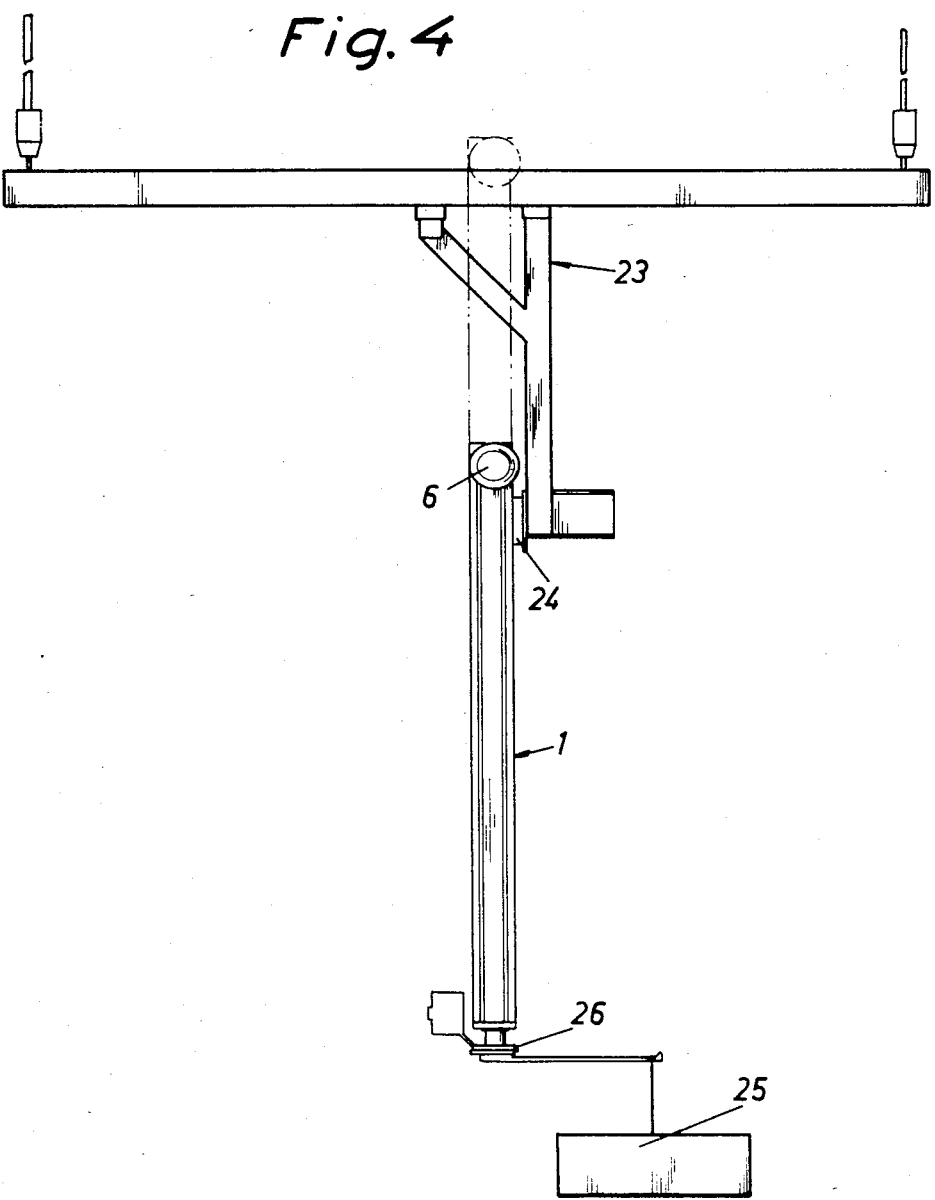

FIGS. 4 and 5 show examples of practical applications of a positioning apparatus in accordance with the invention. FIG. 4 illustrates a positioning apparatus 1 designed to lift and transfer loads in workshops. The positioning apparatus 1 is in this case suspended in an overhead crane 23. The tool fitting or workpiece supporting part 24 of the positioning apparatus, cf. FIG. 1, is secured to a beam in the overhead crane and the function of the apparatus is to lift and lower a load 25. In constructions like the one illustrated it is essential that the load 25 does not fall uncontrollably, even when the current feed to the positioning apparatus is interrupted or the apparatus is otherwise de-energized. For this reason a magnetic brake (not shown) is connected to the shaft driving the spindle 2. The magnetic brake may be of a type known per se. For instance, it may be a disc brake and be arranged to assume its brake-effecting position as soon as the motor 6 driving the apparatus is disconnected. This could be achieved for instance by providing e.g. electro-magnets which upon operation of the motor 6 urge permanent magnets apart, these latter magnets shifting to their braking position as soon as the effect of the electro-magnets ceases.

In accordance with one practical application of the invention in accordance with FIG. 3 a slip-ring device 26 preferably is provided at the lower end of the positioning apparatus 1 in order to allow the apparatus to be operated without using flexes and other equipment that could hamper turning movements of the load relative to the positioning apparatus 1.

In order to protect the interior of the positioning apparatus 1 the latter is provided in a manner known per se with steel strip linings 27 (see FIG. 1), which linings cover the part 28 protruding outside the apparatus 1 but which otherwise abut closely to and cover the groove 29 in which the part 28 travels. The close abutment preferably is achieved through magnetic force obtained from a magnetic material disposed along both edges of the groove 29. The part 24 is secured to the projecting part 28.

FIG. 5 shows an example of combination of two positioning apparatuses 30, 31 in accordance with the invention into a robot. The attachment piece 32 of one of the positioning apparatuses 30 is mounted on a stand 33. A rotary unit 34 is mounted on the outer end of the positioning apparatus 30. The attachment piece 35 of the second positioning apparatus 31 is secured to the rotary unit 34, whereby it becomes possible to turn the positioning apparatus 31 secured thereto relative to the first positioning apparatus 30. At the front end of the positioning apparatus 31 is secured a gripping tool 36. Owing to this arrangement this tool may be operated with great precision in different planes and directions with the aid of the two positioning apparatuses 30 and 31 and the rotary unit 34.

The embodiments of the invention described in the aforegoing are to be regarded as examples only and a number of different applications are possible within the scope of the appended claims. A positioning apparatus in accordance with the invention could for instance, be incorporated in a feeder-belt system comprising more than one feeder belt to effect change-overs between the various feeder belts. Such change-over from one belt to another could be effected both vertically and horizontally.

Another example of a practical application of a positioning apparatus in accordance with the invention is to discharge details one by one from a vertical storage container. This could be effected by placing the positioning apparatus underneath the storage and by providing the apparatus attachment means with a means designed to move one detail at the time laterally.

A positioning apparatus in accordance with the invention could likewise be used to alternately connect together two feeder belts into one, in which case a pivotable bridge is used to effect the connection.

When the positioning apparatus is used as part of a robot in accordance with the embodiment described above it is advisable to couple an electrical signal transducer 37 (FIG. 5) to the apparatus. The signal transducer may be a rail provided with switch means emitting electric output signals. Signal transducers of this kind are capable of sensing the positioning apparatus from a distance as regards limit positions and settings of the runner or runners.

The housing 5 is provided with a groove 38 in order to allow easy and variable mounting of the positioning apparatus 1.

I claim:

1. In an improved positioning apparatus comprising an elongate housing formed from a lightweight metal and defining an axially extending internal cavity, a threaded spindle rotatably mounted in said internal cavity of said housing and extending axially therein, a runner mounted on said spindle and threaded thereto for longitudinal movement in response to rotation of said spindle, a member fixed axially on said runner at least in part within said housing and projecting outwardly therefrom in the transverse direction of said positioning apparatus, at least three spaced longitudinally extending guide members arranged in said housing around and parallel with said spindle and said internal cavity, at least two of said guide members being formed at opposite corners of said housing on one side of a plane containing the axis of said spindle, at least one of the remaining of said guide members being positioned on the opposite side of said plane and lying on a plane perpendicular to the first mentioned plane and containing said spindle axis, said runner traveling backwards and forwards in said housing cavity along said guide members, said guide members being integral parts of said housing, means forming bearing slide surfaces on said guide members and engaged with said runner member projection for reducing friction on said runner's movement on said slide surfaces.

2. An improved positioning apparatus according to claim 1, wherein the housing is manufactured from aluminum, the improvement comprising said slide surfaces being formed by rails of a harder material than said housing and said guide members, said rails being supported on said guide members.

3. An improved positioning apparatus according to claim 1, said housing being manufactured from aluminum or the like, wherein said slide surfaces on said guide members are produced by subjecting the surfaces of said guide members to an anodic treatment.

4. An improved positioning apparatus according to claim 1, comprising bushings mounting said runner, said bushings being movable in the transverse direction of said positioning apparatus.

5. An improved positioning apparatus according to claim 4, comprising bearings of a resilient material provided in said runner and mounting said bushings.

* * * * *